US009787629B2

United States Patent
Shaffer et al.

(10) Patent No.: US 9,787,629 B2
(45) Date of Patent: Oct. 10, 2017

(54) TAGGING POSTED CONTENT IN A SOCIAL NETWORKING SYSTEM WITH MEDIA INFORMATION

(71) Applicant: Facebook, Inc., Menlo Park, CA (US)

(72) Inventors: Justin Alexander Shaffer, San Francisco, CA (US); Robert Taaffe Lindsay, San Francisco, CA (US); Sean Michael Bruich, Portland, OR (US)

(73) Assignee: Facebook, Inc., Menlo Park, CA (US)

( * ) Notice: Subject to any disclaimer, the term of this patent is extended or adjusted under 35 U.S.C. 154(b) by 213 days.

(21) Appl. No.: 14/791,897

(22) Filed: Jul. 6, 2015

(65) Prior Publication Data

US 2015/0312204 A1    Oct. 29, 2015

Related U.S. Application Data

(63) Continuation of application No. 13/332,747, filed on Dec. 21, 2011, now Pat. No. 9,111,317.

(51) Int. Cl.
  *G06F 15/16*  (2006.01)
  *H04L 12/58*  (2006.01)
  *G06Q 50/00*  (2012.01)

(52) U.S. Cl.
  CPC ............ *H04L 51/32* (2013.01); *G06Q 50/01* (2013.01)

(58) Field of Classification Search
  CPC .. G06Q 30/02; G06Q 50/01; G06F 17/30056; H04L 65/4015
  See application file for complete search history.

(56) References Cited

U.S. PATENT DOCUMENTS

| 8,238,528 | B2 | 8/2012 | Zafar |
| 8,290,999 | B2 | 10/2012 | Shepherd et al. |
| 2006/0217990 | A1 | 9/2006 | Theimer et al. |
| 2008/0147650 | A1* | 6/2008 | Marsh .................... G06Q 30/02 |
| 2010/0281108 | A1* | 11/2010 | Cohen ............... G06F 17/30056 709/203 |
| 2011/0047182 | A1* | 2/2011 | Shepherd ............... G06Q 50/01 707/780 |
| 2011/0246910 | A1 | 10/2011 | Moxley et al. |
| 2011/0314995 | A1 | 12/2011 | Lyon et al. |
| 2012/0265328 | A1* | 10/2012 | Kadirkamanathan .......................... H04L 65/4015 700/94 |
| 2012/0284012 | A1 | 11/2012 | Rodriguez et al. |

(Continued)

OTHER PUBLICATIONS

United States Office Action, U.S. Appl. No. 13/332,747, Sep. 11, 2014, fourteen pages.

(Continued)

*Primary Examiner* — Yves Dalencourt
(74) *Attorney, Agent, or Firm* — Fenwick & West LLP

(57) ABSTRACT

A social networking system allows a user to insert media information into content posted by the user, where the media information identifies a media item that the user is consuming while composing the posted content. When a user of a social networking system composes content via a composer interface, the user may select an option on the composer interface to record audio using a microphone on the user's device. A media item is identified from the recorded audio and information about the identified media item is added to the user's posted content. The system may also update information about the identified media item and the composing user.

20 Claims, 4 Drawing Sheets

(56) References Cited

U.S. PATENT DOCUMENTS

2012/0317288 A1 12/2012 Campana et al.
2013/0246138 A1 9/2013 Johnson et al.

OTHER PUBLICATIONS

United States Office Action, U.S. Appl. No. 13/332,747, Feb. 13, 2014, eleven pages.
United States Office Action, U.S. Appl. No. 13/332,747, Aug. 30, 2013, ten pages.

* cited by examiner

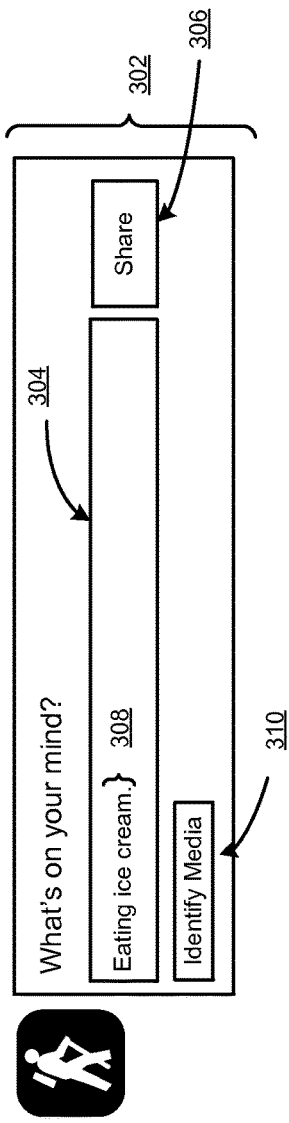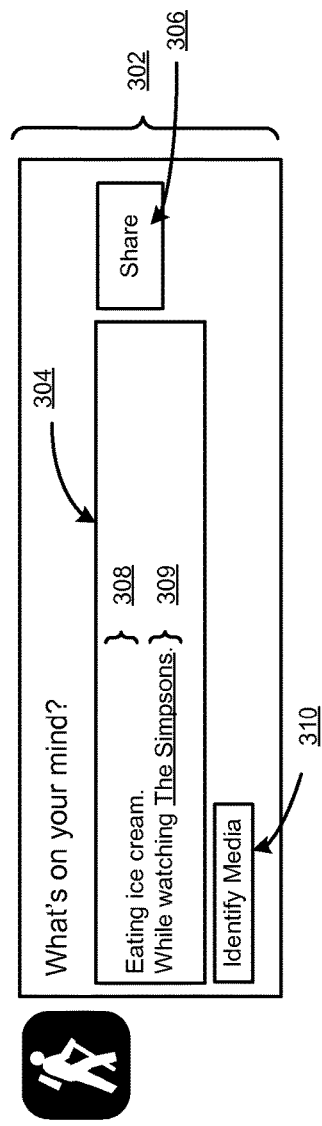

TAGGING POSTED CONTENT IN A SOCIAL NETWORKING SYSTEM WITH MEDIA INFORMATION

This application is a continuation of U.S. patent application Ser. No. 13/332,747, filed Dec. 21, 2011, which is incorporated by reference in its entirety.

BACKGROUND

This invention relates generally to social networking services and more particularly to providing users the ability to identify media information in posted content.

A social networking system may allow a user to communicate within certain social networking system spaces. For example, a user may post a message to the user's profile or to another user's profile, may comment on the user's content items or another user's content items (such as wall posts, images, videos, documents, etc.), may send an instant message or an email to another user, may post a message on a group wall or to a fan page, or any other form of communication within the social networking system.

Users often watch videos or listen to music while using social networking systems and often discuss videos and music within certain spaces of social networking systems. Communications in conventional social networking systems are typically plain text and do not include structured data that associates the communications with media objects. This limits the ability of the social networking users to convey their activities and interests. Accordingly, there is a need for a content delivery mechanism that enables users to identify media items they consume, while also aggregating information about the users' relationships with the media items.

SUMMARY

Systems and methods are disclosed herein for tagging posted content with media information, where the media information describes media items that a user is consuming while composing the posted content. The media information helps convey the user's media interests and the user's current activity to other users of a social networking system. When connections of the composing user view the composing user's posted content, the connections may discover a new media item or learn more about the composing user's media interests. The systems and methods disclosed herein also help social networking systems gather information about the composing user's interests.

In one embodiment, a composing user may select an option of a composer interface to identify a media item that the composing user is currently consuming, which causes a portion of audio to be recorded using the user's device. The recorded audio is sent to a server system where the server identifies a media item associated with the recorded audio and adds media information for the identified media item to the user's posted content. The server sends the user's posted content with the media information to one or more communication channels. In addition, the server system updates information about the connection between the composing user and the identified media item.

BRIEF DESCRIPTION OF THE DRAWINGS

FIG. 3A is a screenshot of a composer interface, in accordance with one embodiment of the invention.

FIG. 3B is a screenshot of a composer interface, in accordance with one embodiment of the invention.

Figure 1:
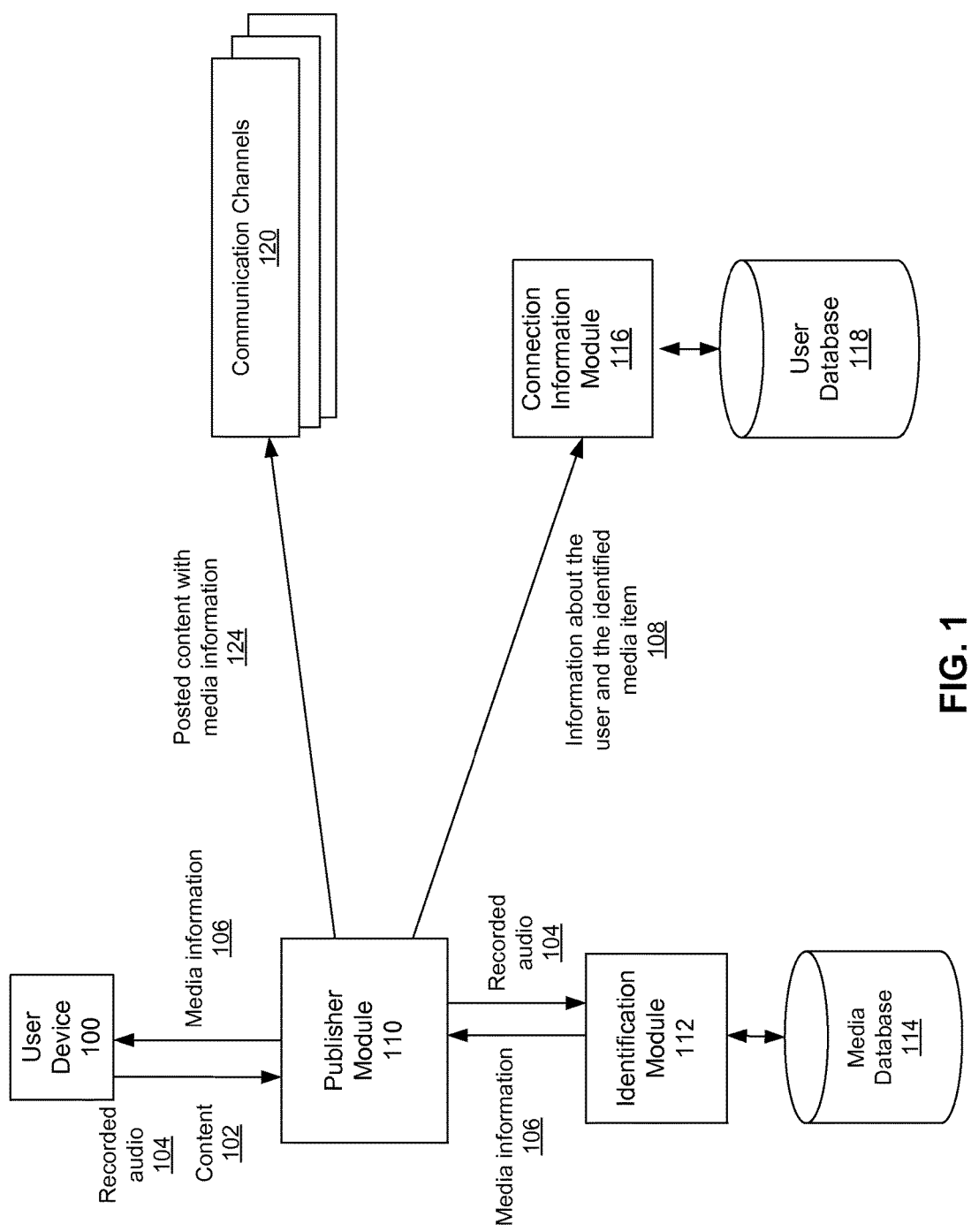
FIG. 1 is a high level block diagram illustrating a system environment suitable for tagging posted content with media information, in accordance with one embodiment of the invention.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION

Social Networking Overview

Online social networking systems comprise one or more computing devices storing a social network, or a social graph, comprising a plurality of users and providing users of the social networking system with the ability to communicate and interact with other users of the social networking system. Social networking systems allow users to explicitly associate themselves and establish connections with other users of the social networking system. When two users become connected, they are said to be "friends," "contacts," "connections," or "associates" within the context of the social networking system. Alternatively, connections may be automatically created by the social networking system based on common characteristics of the users (for example, users who have had a common employer, have a common friend, or like a common film). Generally, being connected in a social networking system allows connected users access to more information about each other than would otherwise be available to unconnected users. Likewise, becoming connected within a social networking system may allow a user greater access to communicate with another user, such as by email (internal and external to the social networking system), instant message, text message, phone, or any other communicative interface. Finally, being connected may allow a user access to view, comment on, download or endorse another user's uploaded content items. Examples of content items include but are not limited to messages, queued messages (e.g., email), text and SMS (short message service) messages, comment messages, messages sent using any other suitable messaging technique, an HTTP link, HTML files, images, videos, audio clips, documents, document edits, calendar entries or events, other user-generated content, and other computer-related files.

Online social networking systems may track objects through the use of a social graph, which includes a plurality of nodes that are interconnected by a plurality of edges. In the social graph, nodes represent objects within the context of the social networking system. Common examples of objects include users, content items, groups, web pages, fan pages, events, messages, concepts, interactions, information, activities, data, computer applications, advertisements or any other entity capable of being represented in a social networking system. Companies, locations, venues, merchants, bands, non-user persons, restaurants, or any other entities may be directly represented by a social networking system object, or may be indirectly represented by an object via a group, web page or fan page within the social networking system dedicated to the entity. For instance, the restaurant "Refuge" or the venue "Orpheum Theatre" may have dedicated objects within the social networking system; alternatively, Refuge may have a fan page and the Orpheum Theatre may have a web page on the social networking system.

An edge between nodes in the social graph represents a particular kind of connection between the two nodes, which may result from an interaction that occurred between the nodes. For instance, for two nodes that represent users, an edge may imply that the users are friends within the context of the social networking system. Alternatively, an edge may imply that the users have communicated with each other, that one user may have viewed the other's profile, that the users attended the same high school, or any other means of connection or interaction. For two nodes where at least one node does not represent a user, an edge may imply similar or different connections or interactions. For example, an edge may indicate a user clicked the "like" button for a group dedicated to a particular band, or that a user clicked on an advertisement. Alternatively, an edge may indicate that two companies, each represented by a social networking system web page, are associated with each other despite no explicit action by either company.

When a new object of a particular type is created, the social networking system may initialize a new node of the corresponding type, may assign a unique object or node identifier to it, and may begin to add data to the object as needed. This might occur, for example, when an individual first becomes a user of the social networking system, when the social networking system generates a new user profile, when a user starts a new group, when a new content item is uploaded to the social networking system, or any other time an object is added to or created within the social networking system. When a new object is created, an edge may be created linking the object node to the node representing the user who created the object. In addition, the social networking system may link the new object node or any existing nodes to other social graph nodes automatically. For instance, if a first user uploads a photograph of a sports bar to the social networking system, and afterwards, a fan page for the sports bar is created, the social networking system may provide an edge between the user node and the fan page node without explicit action by a user. Further, if a second user posts a comment about going to the sports bar on a third user's profile, the second user's and third user's nodes may be automatically connected to the sports bar node without explicit action by either user in regards to the sports bar node.

Users of social networking systems may interact with social networking system objects in a variety of forms, such as by communicating with or commenting on a content item, information or action; clicking a button or link associated with approval (such as a "like" button or the equivalent); sharing a content item, user information or user actions with other users; or downloading or merely viewing a content item. Interaction may also comprise using a computer-based application within the context of the social networking system (such as a video game only accessible and playable from within the social networking system), or an application external to the social networking system (such as a desk top web browser or mobile application) that may or may not interface with the social networking system. Further, interactions also include making a purchase, either in the context of the social networking system, or external to the social networking system; joining, commenting on or subscribing to a social networking system group, web page or fan page; using a mobile device to transmit a current or past location to the social networking system ("checking in" to a location); scheduling a meeting, gathering, errand, vacation, task, objective, reservation, date or any other event or calendar entry; and accepting an invitation to or indicating the intent to attend a meeting, gathering, party, concert, play or any other event. For instance, a user may join a group dedicated to Chopin, may buy tickets to a Chopin performance, may check into the concert hall when the user arrives at the performance, and may post a note to the user's profile reviewing the performance, all of which constitute interactions.

Users of social networking systems may also interact with other users by associating with, connecting to or becoming friends with them, by viewing their profile, by communicating with them, or by having common friends within the social networking system. In addition, a social networking system user may interact with content items, websites, other users, or other information outside of the context of the social networking system's web pages that are connected to or associated with the social networking system. For instance, an article on a news web site might have a "like" button that users of the social networking system can click on to express approval of the article. Likewise, a company's website may provide the ability to join a social networking system group dedicated to the company directly from the company's website. These interactions and any other suitable actions within the context of a social networking system may be recorded in social networking system data, which can be used to generate social endorsement information. The social endorsement information may comprise text, images, links, and/or be of any suitable form necessary to convey social endorsement information to a user.

Overview of Tagging Posted Content with Media Information

FIG. 1 is a diagram of a system environment suitable for tagging posted content with media information, in accordance with one embodiment of the invention. In some embodiments, recorded audio 104 is sent to a publisher module 110 of a social networking system from a composing user's device 100. The portion of audio 104 may be recorded while the composing user creates content 102 using a composer interface. The publisher module 110 sends the recorded audio 104 to an identification module 112 in order to identify a media item associated with the recorded audio 104. The identification module 112 identifies a media item associated with the recorded audio 104 and sends media information 106 for the identified media item to the publisher module 110. The media information 106 for the identified media item may include the name of the identified media item, a description of the composing user's activity with respect to the identified media item and a link to a page associated with the identified media item. As used herein, media information is also referred as metadata. The identified media item may, for example, be a song, a radio show, a television show, a movie, a sports broadcast, a podcast, or a video clip. In some embodiments, when the publisher module 110 has not received content 102 from the composing user's device 100, the publisher module 110 sends the media information 106 to the composing user's device 100. In some embodiments, when the publisher module 110 has received content from the composing user's device 100, the publisher module 110 adds the media information 106 to the content 102 in order to create posted content 124. The posted content 124 includes both the content 102 created by the composing user and media information 106 for the identified media item. For example, the posted content 124 may include the text "Eating donuts while watching the Simpsons," where the text "Eating donuts" corresponds to user created content 102 and the text "while watching the Simpsons" corresponds to the media information 106. The publisher module 110 sends the posted content 124 to one or more communication channels 120 where the posted content 124 may be viewed by one or more users connected to the composing user. In some embodiments, the publisher module 110 sends information about the composing user and the identified media item 108 to the connection information module 116 to update information about the composing user and the identified media item.

The communication channels 120 may comprise one or more different information delivery methods, comprising a stream, a feed, a wall post, an email communication, a comment on a posted content item, a mobile application, a note, a third-party application, a text message, a third-party website, an advertising communication channel, a discussion board, or any other communication channel that exists or is associated with the social networking service. A discussion board may reside on many different types of objects, such as an event, a group, a fan page, and a photo album, just to name a few. Communication channels are discussed further in U.S. patent application Ser. No. 12/253,149, filed on Oct. 16, 2008, which is hereby incorporated by reference in its entirety.

The identification module 112 receives audio recordings from the publisher module 110 and identifies one or more media items associated with an audio recording based on information from the media database 114. In some embodiments, the identification module 112 uses audio fingerprinting techniques to identify media items associated with an audio recording. The identification module 112 may convert an audio recording into a condensed digital summary using a fingerprint algorithm. The fingerprint algorithm may be stored with the identification module 112 and may be any known fingerprint algorithm. The identification module 112 matches the condensed digital summary of the audio recording to a digital fingerprint stored in the media database 114 in order to identify media items associated with the audio recording. When a match is found, the identification module 112 retrieves media information for the identified media item and sends the media information to the publisher module 110. The media information may be retrieved from an electronic program guide, a music or movie database, or any other suitable source. In some embodiments, the media information is retrieved from the media database 114.

In some embodiments, the identification module 112 uses a watermarking technique to identify media items associated with an audio recording. Any known watermark identification technique may be used. The identification module 112 analyzes the audio recording for an audio signal that matches a watermark stored in the media database 114. When a match is found, the identification module 112 retrieves media information for the identified media item and sends the media information to the publisher module 110.

In some embodiments, when the identification module 112 identifies several media items in an audio recording, the identification module 112 sends media information for each of the identified media items to the publisher module 110. In some embodiments, when the identification module 112 identifies several potential matches of media items, the identification module 112 generates a list of the potential matches and sends the list to the publisher module 110.

The connection information module 116 updates information about a user and one or more identified media items. The connection module 116 receives a user identifier and one or more media item identifiers from the publisher module 110 and updates information about the user corresponding to the user identifier and the one or more media items corresponding to the media item identifiers. The information about the user and the one or more identified media items is stored in the user database 118. The user identifier may correlate to a user profile stored in the user database 118. The media item identifiers identify media items stored in the media database 114 that have been identified by the identification module 112 as matching an audio recording.

In some embodiments, the connection information module 116 updates or generates an affinity score between the user and one or more identified media items. In this context, an affinity score indicates the strength of interest between the user and the one or more identified media items. A user's affinity scores are stored in the user database 118 with the user's profile. When a song is identified, the connection module 116 may update affinity scores between the user and the artist, the song or the category of song. When a radio show is identified, the connection module 116 may update affinity scores between the user and one or more hosts of the radio show and/or the radio station that broadcasts the radio show. When a podcast is identified, the connection module 116 may update affinity scores between the user and one or more hosts of the podcast and/or a provider of the podcast. When a sports broadcast is identified, the connection module 116 may update affinity scores between the user and teams or players associated with the broadcast. When a video is identified, the connection module 116 may update affinity scores between a user and the video, the provider of the video or the category of video.

In some embodiments, the connection information module 116 updates information about the user and one or more connections of the user that have a sufficient affinity for the one or more identified media items. The connection information module 116 identifies a user's connections from information stored for the user in the user database 118 and identifies connections that have an affinity score for one or more identified media items over a threshold score. For example, when a song is identified for a user, the connection information module 116 may update the affinity score between the user and a connection of the user that also likes the song.

The media database 114 stores information to identify media items and media information for the media items. In some embodiments, the information to identify media items includes watermarks and fingerprints. The watermarks and the fingerprints in the media database 114 may identify songs, radio shows, podcast, sports broadcasts, television programs, movies, commercials, and video clips. A respective watermark in the media database 114 may correspond to a media item and may include information identifying an audio signal in the media item. The audio signal may have been inserted into the media item by the owner of the media item or a broadcaster of the media item. A fingerprint stores a condensed digital summary that can be used to identify an audio recording or quickly locate similar items in the media database 114.

The media database 114 stores media information for the media items which includes information identifying the name of the item, the creator of the item, the provider of the media item, the category of the media item, and one or more links to objects associated with the media item. For a song, the media information may include the title of the song, the name of the artist and the category of the song. For a video, the media information may include the tile of the video and the category of the video. For a radio show, the media information may identify one or more hosts of the show and the radio station that broadcasts the show. For a sports broadcast, the media information may identify one or more players or teams associated with the broadcast. In some embodiments, the media information includes text that describes a user's action with respect to the identified media item. The text may describe the user as listening to a certain song or watching a television program. The media information for a media item may also include one or more links to objects associated with the media item. The objects may include groups, web pages, fan pages, event pages, or applications. In some embodiments, the media information for a media item includes a link to an object or page where a user can view, listen to, or purchase a media item. In some embodiments, the media information for a media item includes a picture associated with the media item. In some embodiments, the media information for a media item includes an icon that represents the media item. In some embodiments, the media database 114 stores an electronic program guide. In some embodiments, the media information includes instructions to execute an application. The instructions may include instructions to display the application within a composer interface or separately from the composer interface. In some embodiments, the media information includes instructions to insert a link to an application into a composer interface and instructions to insert a message into the composer interface that prompts a user to select the link to the application.

The user database 118 stores user data such as biographic, demographic, and other types of descriptive information (birthday, age, work experience, gender, educational history, hobbies or preferences, interests, geographic location, marital status, household size, political party and the like). The user data may include a list of user identifiers that correspond to a user's connections or friends in the social networking system. The user data may also include affinity scores between the user and the user's connections. The user data may further include information identifying objects that are associated with the user and affinity scores between the user and the objects.

The publisher module 110 enables a composing user to post content with media information. More specifically, the publisher module 110 sends a composer interface to a user device 100, receives content 102 and recorded audio 104, obtains media information 106 for media items identified in the record audio 104, generates posted content 124, and sends the posted content 124 to one or more communication channels 120.

The publisher module 110 sends a composer interface to a user device 100 accessed by a composing user. A request for the composer interface may be sent from the user device 100 to the publisher module 110 in response to the user opening a native application, logging onto the social networking system, or requesting a page of the social networking system. The publisher module 110 may send a web page with the composer interface to the user device 100. The composer interface may comprise any content upload mechanism on a social networking service, such as a text field for inputting a status update, a text field for commenting on a posted content, and a caption for a digital media content item.

Depending on when the composing user submits posted content to the publisher module 110, the publisher module 110 may either generate a user post with posted content and media information or send media information for one or more identified media items to the user device 100. When media information is sent to the user device 100, the media information is added to the user's content in the composer interface.

In some embodiments, the publisher module 110 receives a list of media items that are potential matches in an audio recording. The publisher module 110 sends the list of media items to the composing user in order to let the composing user decide which media item is a match. In some embodiments, the publisher module 110 receives selection of one or more of the media items, retrieves media information for the media items from the media database 114, and generates posted content 124 with the retrieved information. In some embodiments, the publisher module 110 receives selection of one or more of the media items, retrieves media information for the media items from the media database 114, and sends the retrieved media information for the media items to the user device.

The publisher module 110 sends the posted content to one or more communication channels 120. In some embodiments, the publisher module 110 sends the posted content to one or more users that are connected to the composing user. In some embodiments, the publisher module 110 creates a discussion post from posts by users who are connected to each other. The posts from the two users may both contain information or reference the same media item. The discussion post is sent to mutual connections of the two users.

These embodiments described above are merely meant to be exemplary and are not intended to be restrictive. In other embodiments, there are more or fewer components performing the same or substantially similar functions as the components of the embodiment of FIG. 1. In addition, as will be discussed below, in some embodiments, the functionality of the publisher module 110, the identification 112 and the connection information module 116 may be provided by the server system 206; in other embodiments, all or part of this functionality may be provided external to the server system 206.

System Architecture

Figure 2:
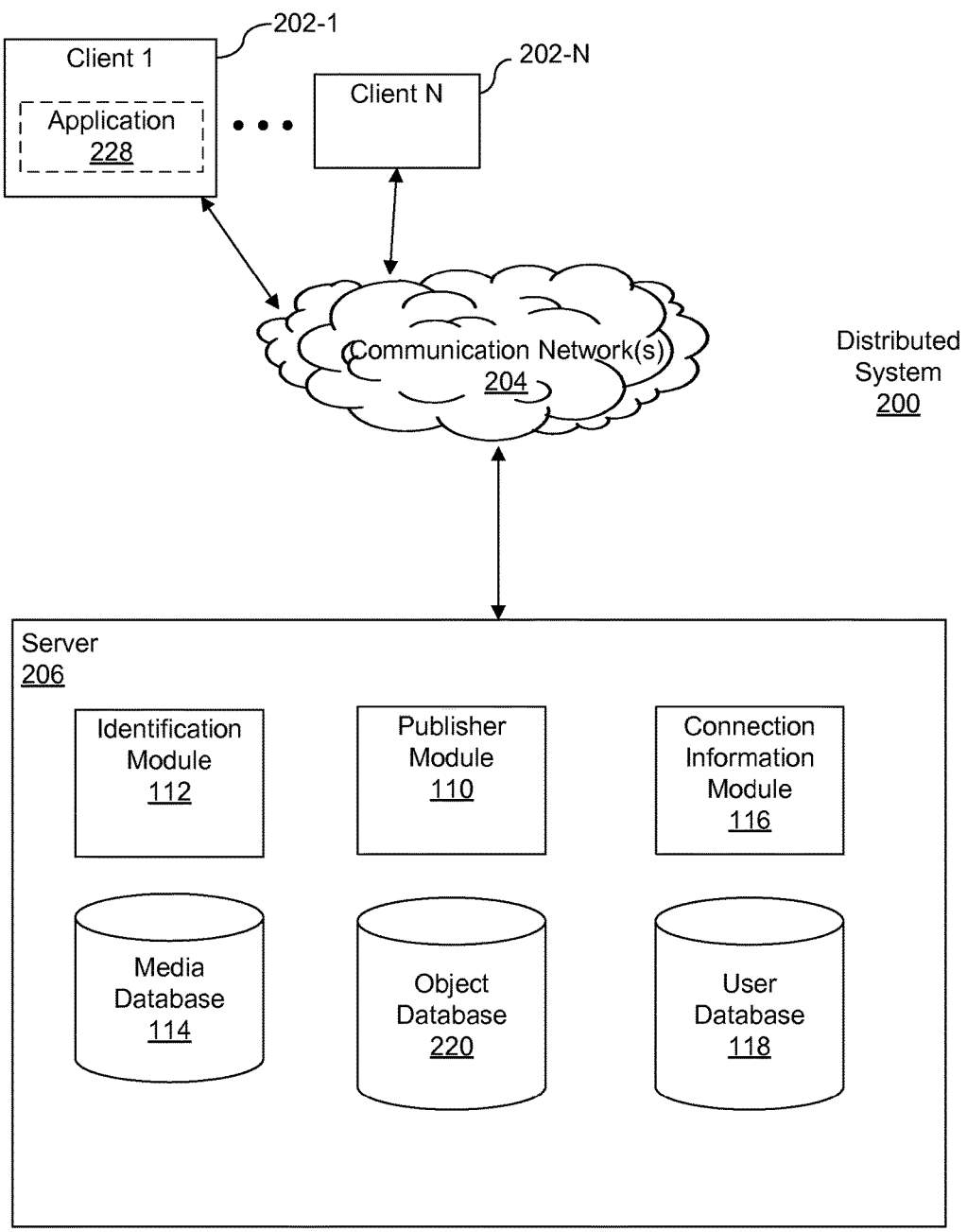
FIG. 2 is a high level block diagram illustrating a system environment suitable for tagging posted content with media information, in accordance with one embodiment of the invention.

FIG. 2 is a high level block diagram of a distributed system 200 of social networking system, according to one embodiment of the invention. The distributed system 200 includes one or more clients 202 and a server system 206 connected by a network 204. In some embodiments, the server system 206 is implemented as a single server, while in other embodiments it is implemented as a distributed system of multiple servers. For convenience of explanation, the server 206 is described below as being implemented on a single server system, but the server 206 may be implemented on a plurality of server computers.

The communication network(s) 204 can be any wired or wireless local area network (LAN) and/or wide area network (WAN), such as an intranet, an extranet, or the Internet. It is sufficient that the communication network 204 provides communication capability between the client devices 202 and the server system 206. In some embodiments, the communication network 204 uses the HyperText Transport Protocol (HTTP) and the Transmission Control Protocol/Internet Protocol (TCP/IP) to transmit information between devices or systems. HTTP permits client device 202 to access various resources available via the communication network 204. The various embodiments of the invention, however, are not limited to the use of any particular protocol.

A user interacts with the server system 206 using a client device 202, which may be any suitable computer device that is capable of connecting to the server system 206 via communication network 204, such as a computer, a desktop computer, a laptop computer, a tablet device, a netbook, an internet kiosk, a personal digital assistants, a mobile phone and a gaming device. The client device 202 may communicate with the server system 206 via an application 228 such as a web browser or native application. Typical interactions between the client device 202 and the server system 206 include operations such as viewing profiles of other users of the server system 206, sending messages to other users, contributing and interacting with media items, joining groups, listing and confirming attendance at events, checking in at locations, liking certain pages, creating pages, and performing other tasks that facilitate social interaction.

The object database 220 stores the objects described above.

Composer Interface

FIG. 3A and FIG. 3B illustrate screenshots of a composer interface. A composer interface enables a user to share content or messages with other users of the social networking system. As shown in FIG. 3A, a composer interface 302 includes an input field 304 in which content may be entered, a button 306 to post content, and a media identification button 310 to identify media items. "Content" may include any type of media content, such as status updates or other textual messages, location information, photos, videos, and links. In the example of FIG. 3A, a user has entered text 308 into the input field 304.

FIG. 3B illustrates a screenshot of the composer interface 302 after a user has selected the media identification button 310. After the selection of the media identification button 310, a portion of audio is recorded using the user's device and sent to a server for media identification.

Media information is received from the server and added to the input field 304. In FIG. 3B, the input field 304 includes user entered content 308 and media information 309 that identifies a media item the composing user was consuming while entering the content 308. The media information 309 comprises metadata about the identified media item, such as the title of a broadcast program being watched or a song title or artist associated with a song being listened to. This metadata may be obtained from various sources, such as an electronic program guide, a music or movie database, or any other suitable source.

The media information 309 may be added to the end of the content 308 entered into the composer interface 302 by the user. In the context of FIG. 3B, the media information 309 identifies a media item (i.e., "The Simpsons"), describes the composing user's activity with respect to the media item (i.e., "watching"), and provides a link to an object associated with the media item. When the user selects the "Share" button 306, the content 308 with the media information 309 is posted to one or more communication channels.

Tagging Status Messages with Media Information

Figure 4:
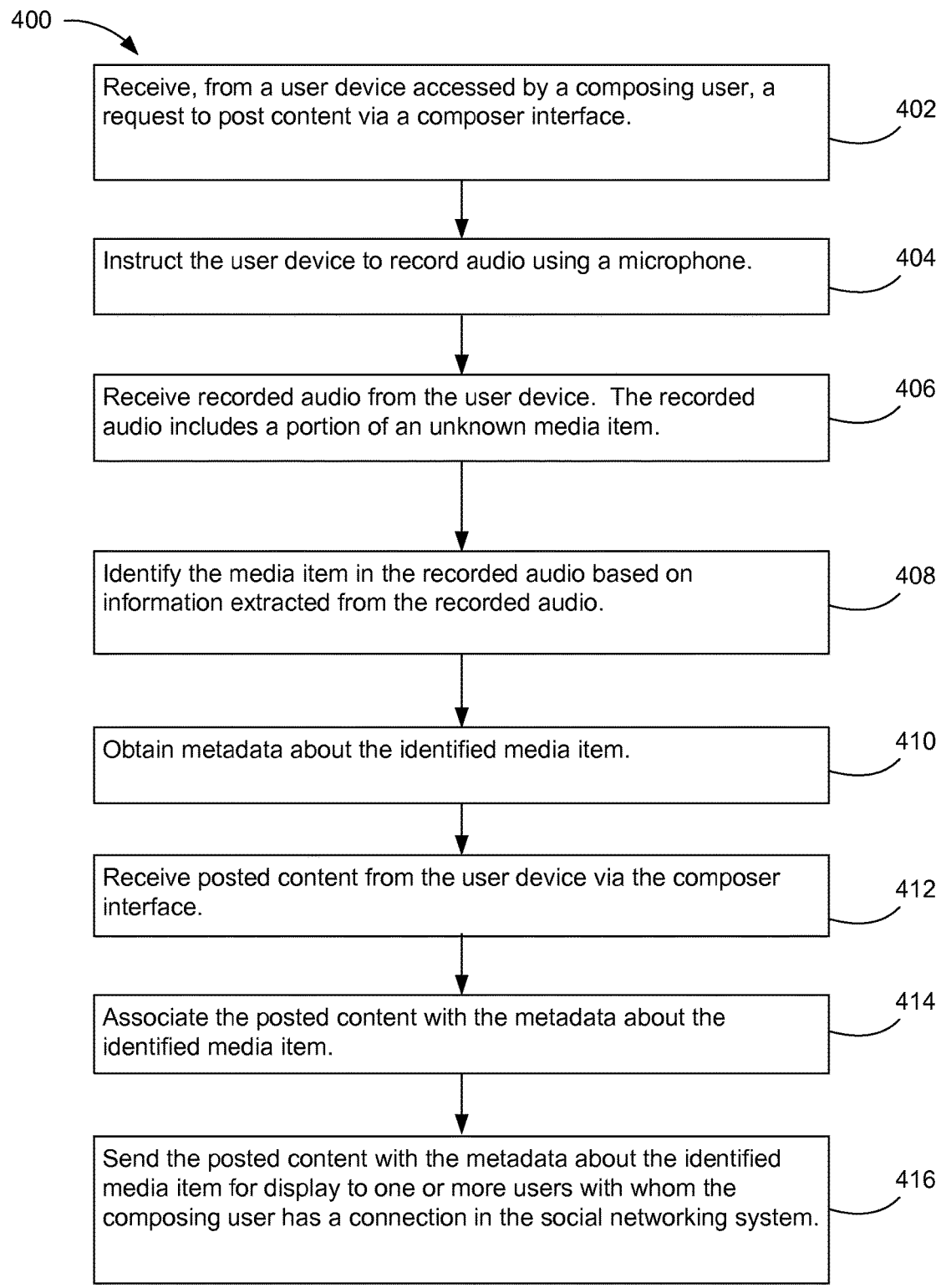
FIG. 4 is a flow chart illustrating a process for tagging posted content with media information, in accordance with one embodiment of the invention.

FIG. 4 is a flow chart illustrating process 400 performed at a server system 206 having one or more processors and non-transitory memory. The non-transitory memory stores one or more programs to be executed by the one or more processors. The one or more programs include instructions for carrying out process 400.

In this process 400, a request to post content via a composer interface is received 402 from a user device accessed by a composing user. The request may be received in response to the composing user selecting the composer interface on a webpage or a native application.

The user device is instructed 404 to record audio using a microphone at the user device. As described above, the publisher module 110 sends a set of instructions to the user device which causes the user device to record a portion of audio using a microphone at the user device. The set of instructions may cause the user device to record audio for a predefined amount of time or until the composing user submits posted content via the composer interface. In some embodiments, the set of instructions is sent to the user device in response to a user selection of a user interface element of the composer interface. For example, the set of instruction may be sent in response to user selection of a button of the composer interface. In some embodiments, the set of instructions is sent in response to the composing user entering content into the composer interface. For example, when the user starts typing text into the composer interface a request for the set of instructions may be sent from the client device to the server.

Recorded audio is received 406 from the user device. The recorded audio includes a portion of an unknown media item. The unknown media item may be a song, television show, or movie. The media item in the recorded audio is identified 408 based on information extracted from the recorded audio. In some embodiments, the media item is identified by matching the extracted information to a media fingerprint. In some embodiments, the media item is identified by matching the extracting information to a media watermark.

Metadata about the identified media item is obtained 410. In some embodiments, the metadata is obtained from an electronic program guide, a music or movie database, or any other suitable source. The metadata includes information about the identified media item. The metadata may include the name of media item and may describe the composing user's activity with respect to the identified media item. For example, the metadata may indicate that the composing user is listening to a song or watching a movie. The metadata may also include a link to an object associated with the identified media item. In some embodiments, the object is a fan page for the media item. In some embodiments, the object is a page where a user can download, listen to, watch, or purchase the identified media item. In some embodiments, the metadata includes a picture associated with the identified media item. The picture may be from an object associated with the identified media. For example, the picture may be from the fan page for the identified media item. When the identified media item is a song, the picture may be a picture of the artist of the song or the album art associated with the song. When the identified media item is a video, the picture may correspond to an image frame from the video. In some embodiment, the metadata includes an icon that represents the identified media item. In some embodiments, the icon represents the type of media item. For example, there may be an icon for songs and a different icon for videos. In some embodiments, the icon is supplied by the owner of the media item.

In some embodiments, when the corresponding posted content has yet to be received from the user device, the metadata is sent to the user device to be inserted into the posted content. In some embodiments, the metadata includes instructions or data that causes the metadata to be displayed in the composer interface on the user device. In some embodiments, the metadata is inserted at the end of the content inputted by the composing user. The metadata may be inserted into the composer interface while the user enters content into the composer interface. In some embodiments, the metadata causes the user device to retrieve and execute an application from the server system 206. For example, if the television show American Idol is identified, the metadata may include instructions to execute a voting application associated with American Idol on the user device. The application may be displayed within the composer interface or displayed separately from the composer interface. From the composing user's perspective, identifying a media item triggers an application that is related to the identified media item.

Posted content is received 412 from the user device via the composer interface. In some embodiments, the posted content includes content composed by the composing user. In some embodiments, the posted content is a status update message from the composing user. In some embodiments, the posted content includes the metadata and content from composing user.

The posted content is associated 414 with the metadata about the identified media item. The metadata may be inserted into the posted content and placed at the end of the content provided by the composing user. As discussed above, in some embodiments, metadata data is inserted into the posted content that causes the user device to retrieve and execute an application from the server system 206.

The posted content with the metadata about the identified media item is sent 416 for display to one or more users with whom the composing user has a connection in the social networking system. In some embodiments, the posted content is sent via one or more communication channels of the social networking system. In some embodiments, the server combines the posted content from the composing user and posted content from one or more connections of the composing user to create a discussion post. The posted content from the composing user and the posted content from one or more connections of the composing user may include metadata for the same media item. For example, if a first user's post includes metadata for a song and a post from a second user (that is connected to the first user) also includes the metadata for the song, a combined post is created from the two posts and sent to mutual connections of the first and second user.

In some embodiments, information about the composing user and the identified media item is updated. In some embodiments, an affinity score between the composing user and the identified media item is increased. In some embodiments, an affinity score between the composing user and the category corresponding to the identified media item is updated. For example, if the identified media item is a movie from the drama category, then the composing user's affinity for movie category of drama is increased. In some embodiments, the affinity score between the composing user and connections of the composing user that have a sufficient interest in the identified media item is updated. For example, if the identified media item is a song and a connection of the composing user has a sufficient interest in the song, then the affinity between the composing user and the connection is increased.

SUMMARY

The foregoing description of the embodiments of the invention has been presented for the purpose of illustration; it is not intended to be exhaustive or to limit the systems and methods to the precise forms disclosed. Persons skilled in the relevant art can appreciate that many modifications and variations are possible in light of the above disclosure.

Some portions of this description describe the embodiments of the systems and methods in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the systems and methods may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the systems and methods may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the systems and methods systems and methods be limited not by this detailed description, but rather by any claims that issue on an application based hereon. Accordingly, the disclosure of the embodiments of the systems and methods are intended to be illustrative, but not limiting, of the scope of the invention, which is set forth in the following claims.

The invention claimed is:

1. A computer-implemented method comprising:
   receiving, from a user device accessed by a composing user, a request to identify a media item being consumed by the composing user in response to the composing user interacting with a composer interface of a social networking system;
   instructing the user device to record, using a microphone of the user device, audio containing a portion of the consumed media item;
   receiving, from the client device, the recorded audio containing the portion of the consumed media item;
   identifying a matching media item in a media database in response to information extracted from the matching media item matching information extracted from the recorded audio, the media database comprising information extracted from a plurality of media items;

receiving, from the client device, composed content entered in the composer interface by the composing user;

generating, by a processor, a social network post comprising media information describing the matching media item, the social network post further comprising the composed content entered in the composer interface;

identifying a post receiving user who is connected to the composing user in the social networking system in response to a first affinity score between the post receiving user and the matching media item exceeding a threshold affinity score;

increasing a second affinity score between the composing user and the post receiving user in response to the first affinity score exceeding the threshold affinity score; and sending the social network post comprising the media information and the composed content to the post receiving user based on the first affinity score and the second affinity score.

2. The method of claim 1, wherein the social network post includes action media information describing an action of the user with respect to the consumed media, the action media information arranged adjacent to media information identifying the matching media item.

3. The method of claim 1, wherein receiving the composed content comprises:

sending media information about the selected media item to the user device for display in the composer interface; and receiving the social network post comprising the sent media information incorporated with the composed content.

4. The method of claim 1, further comprising increasing a third affinity score indicating strength of interest between the composing user and a category of the matching media item in response to identifying the matching media item.

5. The method of claim 1, further comprising increasing a third affinity score indicating strength of interest between the composing user and a social networking entity associated with the matching media item in response to identifying the matching media item.

6. The method of claim 1, wherein the retrieved media information causes the user device to retrieve an application related to the selected media item from the social networking system and to execute the application.

7. The method of claim 1, wherein instructing the user device to record the audio comprises instructing the user device to record the audio until the user enters the composed content in the composer interface.

8. The method of claim 1, wherein instructing the user device to record the audio comprises instructing the user device to record the audio for a predefined period of time.

9. The method of claim 1, wherein the information extracted from the matching media item and the information extracted from the recorded audio comprise at least one of a media fingerprint and a media watermark.

10. A computer program product comprising a non-transitory computer-readable medium having instructions encoded thereon that, when executed, cause a processor to perform steps comprising:

receiving, at a user device, a request to identify a media item being consumed by a composing user, the request comprising the composing user interacting with a composing interface of a social networking system presented by the user device;

recording, using a microphone of the user device, audio containing a portion of the consumed media item;

sending, from the user device, the recorded audio for identification of a matching media item from a plurality of media items, information extracted from the matching media item matching information extracted from the recorded audio;

receiving, at the user device, media information describing the identified media item in response to sending the recorded audio for identification, the media information comprising a link to an application related to the selected media item;

presenting, in the composer interface, the media information describing the identified media item, the presented media information comprising the link to the application; and in response to selection of the link by the composing user through the user device:

retrieving the application from the social networking system, and executing the application at the user device, the executed application presented in an interface of the social networking system presented by the user device;

receiving, at the user device, composed content input into the composer interface by the composing user;

generating a social network post by combining the received media information with the composed content; and sending the social network post comprising the media information including the link to the application related to the selected media item and the composed content to the social networking system for presentation to other users.

11. The computer program product of claim 10, wherein generating the social network post comprises:

receiving action media information describing an action of the user with respect to the consumed media;

receiving identification media information identifying the consumed media; and generating the social network post to include the action media information adjacent to the identifying media information.

12. The computer program product of claim 10, wherein recording the audio comprises recording the audio until the user enters the composed content in the composer interface.

13. The computer program product of claim 10, wherein recording the audio comprises recording the audio for a predefined period of time.

14. The computer program product of claim 10, wherein the information extracted from the matching media item and the information extracted from the recorded audio comprise at least one of a media fingerprint and a media watermark.

15. A computer program product comprising a non-transitory computer-readable medium having instructions encoded thereon that, when executed, cause a processor to perform steps comprising:

receiving, from a user device accessed by a composing user, a request to identify a media item being consumed by the composing user in response to the composing user interacting with a composer interface of a social networking system;

instructing the user device to record, using a microphone of the user device, audio containing a portion of the consumed media item;

receiving, from the client device, the recorded audio containing the portion of the consumed media item;

identifying a matching media item in a media database in response to information extracted from the matching media item matching information extracted from the recorded audio, the media database comprising information extracted from a plurality of media items;

receiving, from the client device, composed content entered in the composer interface by the composing user;

generating a social network post comprising media information describing the matching media item, the social network post further comprising the composed content entered in the composer interface;

identifying a post receiving user who is connected to the composing user in the social networking system in response to a first affinity score between the post receiving user and the matching media item exceeding a threshold affinity score;

increasing a second affinity score between the composing user and the post receiving user in response to the first affinity score exceeding the threshold affinity score; and sending the social network post comprising the media information and the composed content to the post receiving user based on the first affinity score and the second affinity score.

16. The computer program product of claim 15, wherein the social network post includes action media information describing an action of the user with respect to the consumed media, the action media information arranged adjacent to media information identifying the matching media item.

17. The computer program product of claim 15, wherein receiving the composed content comprises:
sending media information about the selected media item to the user device for display in the composer interface; and
receiving the social network post comprising the sent media information incorporated with the composed content.

18. The computer program product of claim 15, further comprising increasing a third affinity score indicating strength of interest between the composing user and a category of the matching media item in response to identifying the matching media item.

19. The computer program product of claim 15, further comprising increasing a third affinity score indicating strength of interest between the composing user and a social networking entity associated with the matching media item in response to identifying the matching media item.

20. The computer program product of claim 15, wherein the retrieved media information causes the user device to retrieve an application related to the selected media item from the social networking system and to execute the application.

* * * * *